(12) United States Patent
Binette et al.

(10) Patent No.: US 9,789,370 B2
(45) Date of Patent: Oct. 17, 2017

(54) GOLF BALL DIMPLES EXHIBITING TWO DISTINCT HARDNESS REGIONS DERIVED FROM A SINGLE COVER LAYER AND METHODS OF MAKING SAME

(71) Applicant: Acushnet Company, Fairhaven, MA (US)

(72) Inventors: Mark L. Binette, Mattapoisett, MA (US); Brian Comeau, Berkley, MA (US); Michael R. Madson, Easton, MA (US); Michael Michalewich, Norton, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 306 days.

(21) Appl. No.: 14/743,240

(22) Filed: Jun. 18, 2015

(65) Prior Publication Data

US 2016/0367867 A1    Dec. 22, 2016

(51) Int. Cl.
| | | |
|---|---|---|
| *B29C 39/10* | (2006.01) | |
| *B29C 45/16* | (2006.01) | |
| *A63B 45/00* | (2006.01) | |
| *B29C 39/02* | (2006.01) | |
| *B29C 39/00* | (2006.01) | |
| *B29K 75/00* | (2006.01) | |
| *B29C 33/00* | (2006.01) | |
| *B29C 35/08* | (2006.01) | |

(52) U.S. Cl.
CPC ............ *A63B 45/00* (2013.01); *B29C 39/026* (2013.01); *B29C 35/0805* (2013.01); *B29C 39/006* (2013.01); *B29C 2033/0094* (2013.01); *B29C 2035/0827* (2013.01); *B29K 2075/00* (2013.01)

(58) Field of Classification Search
CPC ..... B29C 39/10; B29C 45/16; A63B 37/0031; A63B 37/0032
See application file for complete search history.

(56) References Cited

U.S. PATENT DOCUMENTS

| | | | | |
|---|---|---|---|---|
| 5,849,168 | A * | 12/1998 | Lutz ................... | A63B 37/0003 264/255 |
| 6,033,724 | A * | 3/2000 | Molitor .............. | A63B 37/0022 427/133 |
| 6,120,394 | A * | 9/2000 | Kametani .......... | A63B 37/0003 101/492 |

(Continued)

OTHER PUBLICATIONS

O-Rings, Inc., "How to make a Golf Ball". Brochure, 2015.*

(Continued)

*Primary Examiner* — Bret Chen
(74) *Attorney, Agent, or Firm* — Smith, Gambrell & Russell, LLP

(57) ABSTRACT

The present invention is directed to a golf ball having a cover in which the dimples have two distinct hardness regions. The cover of the present invention is formed from a castable formulation including at least one prepolymer that incorporates some degree of unsaturation in the backbone of the polymer, at least one curative, and at least one free radical initiator. The present invention also explores the methods of making such golf balls. The methods of the present invention allow for the production of a golf ball dimple with two distinct hardnesses to be formed using a single castable formulation.

20 Claims, 8 Drawing Sheets

(56) References Cited

U.S. PATENT DOCUMENTS

| | | | | |
|---|---|---|---|---|
| 6,465,546 B1* | 10/2002 | Jackson | ............ | A63B 37/0003 |
| | | | | 473/371 |
| 2003/0102595 A1* | 6/2003 | Puniello | ............ | B29C 45/14819 |
| | | | | 264/219 |
| 2004/0209708 A1* | 10/2004 | Bulpett | ............ | A63B 37/0003 |
| | | | | 473/378 |
| 2012/0286449 A1* | 11/2012 | Michalewich | ..... | A63B 37/0031 |
| | | | | 264/279 |
| 2013/0324325 A1* | 12/2013 | Maxwell | ............ | A63B 37/0019 |
| | | | | 473/377 |

OTHER PUBLICATIONS

Dalton, Jeff, Compression by Any Other Name, Science and Golf IV, *Proceedings of the World Scientific Congress of Golf* (Eric Thain ed., Routledge, 2002) ("J. Dalton").

* cited by examiner

GOLF BALL DIMPLES EXHIBITING TWO DISTINCT HARDNESS REGIONS DERIVED FROM A SINGLE COVER LAYER AND METHODS OF MAKING SAME

FIELD OF THE INVENTION

The present invention relates to golf balls, and more particularly to golf balls having dimples exhibiting two distinct hardness regions derived from a single cover layer. The present invention also relates to methods for making the golf balls.

BACKGROUND OF THE INVENTION

Golf ball manufacturers produce golf balls such that dimples are formed in the outer surface. The dimples on a golf ball are important in manipulating the aerodynamic forces generated by a ball in flight as a result of the ball's velocity and spin. Recently, golf ball manufacturers have found that by varying the hardness of the dimple, different spin characteristics may be exhibited.

However, if a golf ball designer wants to make a golf ball with dimples containing multiple hardnesses, they cannot do so with a single layer. Rather, the most common way of creating a golf ball dimple with multiple hardness regions is to construct a ball in which the underlying layer protrudes into specific regions of the cover layer, thereby partially filling in the desired portion of the dimple. Later, an additional layer, in most cases a castable liquid, is applied thus forming a complete dimple. However, this process requires the use of at least two different layers.

Accordingly, there remains a need for golf balls having dimples exhibiting multiple hardness regions but formed from a single layer to enhance the aerodynamic performance of the golf ball.

SUMMARY OF THE INVENTION

The present invention is directed to a method of forming a golf ball, including providing a core; preparing a castable formulation including at least one prepolymer, at least one curative, and at least one free radical initiator; casting the formulation into upper and lower cavities of a golf ball mold, where upon joining the upper and lower cavities, the core is contained within the formulation; curing the formulation to form a provisional golf ball having an outermost surface including a plurality of dimples; placing the provisional golf ball into a second mold, where the second mold includes upper and lower masks, and where the upper and lower masks expose at least a portion of the outermost surface; and subjecting the second mold to a treatment capable of initiating free radicals in the formulation, where the exposed portion of the outermost surface undergoes additional curing to form an outermost surface including an exposed portion and a masked portion, where the exposed portion of the outermost surface has a different hardness than the masked portion of the outermost surface.

In this aspect, the prepolymer is a reaction product of an isocyanate-containing component and an isocyanate-reactive component. For example, the isocyanate-reactive component includes a conjugated diene hydrocarbon. In another embodiment, the curative includes an amine-terminated curing agent, a hydroxy-terminated curing agent, or a combination thereof. In yet another embodiment, the step of curing is performed at a temperature of about 100° F. to about 250° F.

The free radical initiator includes a peroxide, a persulfate, an azo compound, a benzophenone, a hydrazide, or a combination thereof. In one embodiment, the treatment includes ultraviolet light, heat, fiber optic lights, or combinations thereof. In another embodiment, the exposed portion has a hardness of about 55 Shore D to about 75 Shore D and the masked portion has a hardness of about 30 Shore D to about 50 Shore D. In this aspect, the masked portion has a first crosslinking density and the exposed portion has a second crosslinking density, where the second crosslinking density is greater than the first crosslinking density by at least about 15 percent.

The present invention is also directed to a method of forming a golf ball, including preparing a castable formulation including at least one prepolymer that is a reaction product of an isocyanate-containing component and an isocyanate-reactive component, at least one curative, and at least one free radical initiator; providing a core of a golf ball; casting the formulation over a core in the golf ball mold; curing the formulation to form a provisional golf ball including a cover layer having a first crosslinking density and a first hardness, where the golf ball cover layer includes a plurality of dimples; placing the provisional golf ball into a second mold, where the second mold masks a first portion of the golf ball cover layer and exposes a second portion of the golf ball cover layer; and subjecting the second mold to ultraviolet light such that the second portion of the golf ball cover layer undergoes additional curing and has a second hardness and a second crosslinking density, where the second hardness is at least 20 percent greater than first hardness.

In this aspect of the invention, the isocyanate-reactive component includes a conjugated diene hydrocarbon. In one embodiment, the step of subjecting the second mold to ultraviolet light is performed for about one minute to about two minutes. In another embodiment, the second hardness is about 55 Shore D to about 75 Shore D and the first hardness is about 30 Shore D to about 50 Shore D. In yet another embodiment, the step of curing is performed at a temperature of about 100° F. to about 250° F.

The present invention further provides a method of forming a golf ball, including preparing a castable formulation including at least one prepolymer having a conjugated diene hydrocarbon, at least one curative, and at least one peroxide; providing a golf ball core; casting the formulation over the golf ball core in a first mold; curing the formulation to form a provisional golf ball including a plurality of dimples, where the provisional golf ball has an outermost cover layer having a first crosslinking density; placing the provisional golf ball into a second mold, where the second mold includes exposure areas and masked areas; and contacting the areas of the outermost cover layer exposed via the exposure areas with a heated protrusion to form a golf ball including the exposed areas, where the exposed areas of the underlying outermost cover layer have a second crosslinking density greater than the first crosslinking density and a hardness of about 55 Shore D to about 75 Shore D and the masked areas of the underlying outermost cover layer have a hardness of about 30 Shore D to about 50 Shore D. The method of the present invention may also include maintaining the second mold at a temperature of about 60° F. to about 70° F.

In one embodiment, the heated protrusion is heated to a temperature ranging from about 250° F. to about 400° F. For example, the heated protrusions may include injectable pins. In another embodiment, the peroxide includes dicumyl peroxide, α-α-bis(t-butyl peroxy) diisopropylbenzene, or combinations thereof. In yet another embodiment, the step of curing is performed at a temperature of about 100° F. to about 250° F.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
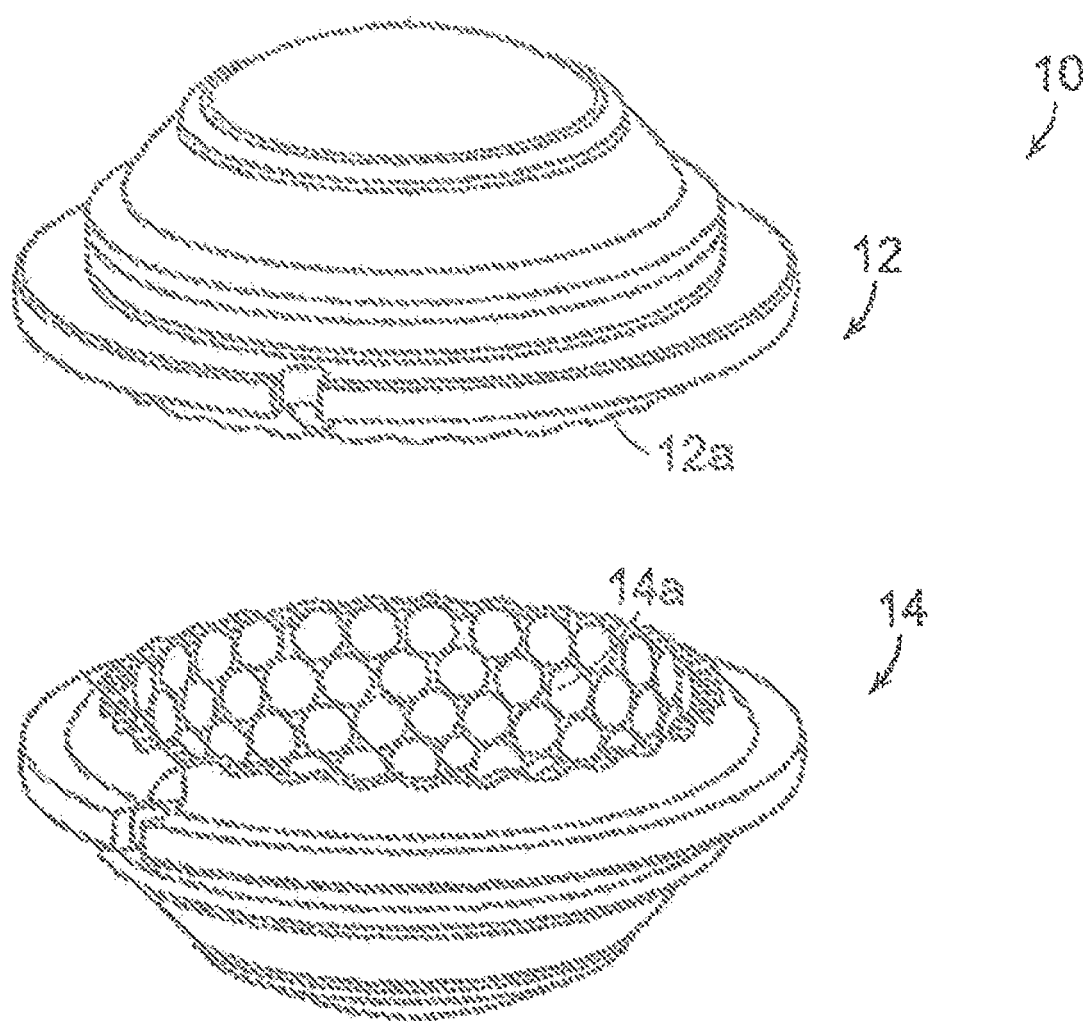
FIG. 1 is a perspective view of upper and lower mold cavities.

The present invention is directed to a golf ball having a core and a cover of at least one layer where the dimples formed in the outermost cover layer have two distinct hardness regions. The outermost cover layer of the present invention is formed from a castable formulation including at least one prepolymer that incorporates some degree of unsaturation in the backbone of the polymer, at least one curative, and at least one free radical initiator. Through the use of a prepolymer with an unsaturated backbone, it is possible to chain extend the isocyanate groups, producing a certain hardness; then, later breaking the double bonds of the unsaturated compound through the use of free radical initiators, thus creating a different hardness. Without being bound to any particular theory, it is believed that the different hardness regions of the dimple will deliver different spin characteristics depending on the golf club chosen.

The present invention also explores the golf ball constructions suitable for use with the present invention and the methods of making such golf balls. The methods of the present invention allow for the production of a golf ball with the outermost cover layer including at least one dimple with two distinct hardnesses.

The Castable Formulation

The present invention contemplates the use of a castable formulation to form the outermost cover layer of a golf ball. In particular, the castable formulation includes at least one prepolymer that incorporates a certain degree of unsaturation in the backbone of the polymer, at least one curative, and at least one free radical initiator.

The prepolymer of the present invention is the reaction product of an isocyanate-containing component and an isocyanate-reactive component, which is crosslinked with at least one curing agent. The reaction product of the isocyanate-containing component and isocyanate-reactive component produces a prepolymer including polyurethane linkages, polyurea linkages, or combinations thereof. The curative includes a hydroxy-terminated curing agent, an amine-terminated curing agent, or combinations thereof. The components of the formulation are described in more detail below.

Prepolymer

Suitable prepolymers for use in the outermost cover formulations of the invention may include polyurethane linkages, polyurea linkages, or combinations thereof. For example, the outermost cover layer may be formed from a reaction product that ultimately results in a prepolymer that includes only urethane linkages, which is referred to herein as a "polyurethane prepolymer." In another aspect, the outermost cover layer may be formed from a reaction product that ultimately results in a prepolymer that includes only urea linkages, which is referred to herein as a "polyurea prepolymer." In yet another aspect, the outermost cover layer may be formed from a reaction product that ultimately results in a prepolymer that includes both urethane and urea linkages, which is referred to herein as a "hybrid prepolymer." Each of the prepolymers is discussed in more detail below.

Polyurethane Prepolymer

When the outermost cover layer is formed from a reaction product that ultimately results in a prepolymer that includes only urethane linkages, the prepolymer is the reaction product of at least one isocyanate and at least one hydroxy-terminated component. The components of the polyurethane prepolymer may be aromatic, aromatic-aliphatic, or aliphatic, which provide varying degrees of light stability. As used herein, aromatic aliphatic compounds should be understood as those containing an aromatic ring, wherein the isocyanate group is not directly bonded to the ring.

Isocyanates for use with the polyurethane prepolymer include aliphatic, cycloaliphatic, aromatic aliphatic, aromatic, derivatives thereof, and combinations of these compounds having two or more isocyanate (NCO) groups per molecule. The isocyanate may be saturated to improve the light stability of the formulations of the invention. The isocyanates may be organic polyisocyanate-terminated precursors, low free isocyanate precursors, and mixtures thereof. The isocyanate component may also include any isocyanate-functional monomer, dimer, trimer, or multimeric adduct thereof, precursor, quasi-precursor, or mixtures thereof. Isocyanate-functional compounds may include monoisocyanates or polyisocyanates that include any isocyanate functionality of two or more.

Suitable isocyanate-containing components include diisocyanates having the generic structure: O═C═N—R—N═C═O, where R is preferably a cyclic or linear or branched hydrocarbon moiety containing from about 1 to 20 carbon atoms. The diisocyanate may also contain one or more cyclic groups. When multiple cyclic groups are present, linear and/or branched hydrocarbons containing from about 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or a mixture thereof.

Examples of saturated (aliphatic) diisocyanates that can be used in the polyurethane precursor include, but are not limited to, ethylene diisocyanate; propylene-1,2-diisocyanate; tetramethylene diisocyanate; tetramethylene-1,4-diisocyanate; 1,6-hexamethylene diisocyanate (HDI); HDI biuret prepared from HDI; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate;

cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}MDI$); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In one embodiment, the saturated diisocyanates include isophoronediisocyanate (IPDI), 4,4'-dicyclohexylmethane diisocyanate ($H_{12}MDI$), 1,6-hexamethylene diisocyanate (HDI), or a combination thereof.

Aromatic aliphatic isocyanates may also be used to form the polyurethane precursor. While use of aromatic aliphatic materials does not confer the same amount of light stability to the resultant product compared to those including purely aliphatic materials, it does provide a greater degree of light stability to the resultant product compared to those formed with purely aromatic materials. Examples of aromatic aliphatic isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; a modified polyisocyanate derived from the above isocyanates and polyisocyanates; and mixtures thereof. In addition, the aromatic aliphatic isocyanates may be mixed with any of the saturated isocyanates listed above for the purposes of this invention.

Unsaturated diisocyanates, i.e., aromatic compounds, may also be used with the present invention, although the use of unsaturated compounds in the precursor is preferably coupled with the use of a light stabilizer or pigment. Examples of unsaturated diisocyanates include, but are not limited to, substituted and isomeric mixtures including 2,2'-, 2,4'-, and 4,4'-diphenylmethane diisocyanate (MDI), 3,3'-dimethyl-4,4'-biphenyl diisocyanate (TODI), toluene diisocyanate (TDI), polymeric MDI (PMDI, a brown liquid composed of approximately 50% methylene diisocyanate with the remainder comprised of oligomers of MDI), carbodiimide-modified liquid 4,4'-diphenylmethane diisocyanate, para-phenylene diisocyanate (PPDI), meta-phenylene diisocyanate (MPDI), triphenylmethane-4,4'-, and triphenylmethane-4,4''-triisocyanate, naphthylene-1,5-diisocyanate, 2,4'-, 4,4'-, and 2,2'-biphenyl diisocyanate, polyphenylene polymethylene polyisocyanate (PMDI) (also known as polymeric PMDI), and mixtures thereof.

An isocyanate group reacts with the hydroxy groups of the hydroxy-terminated component to form a repeating urethane linkage, which has the following general structure:

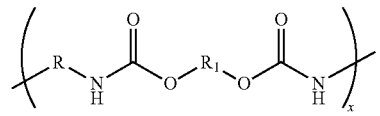

where x is the chain length, i.e., about 1 or greater, and R includes straight chain or branched hydrocarbon chains having about 1 to about 20 carbons, phenyl groups, and mixtures thereof, and $R_1$ is a straight chain or branched hydrocarbon chain having about 1 to about 20 carbons.

The hydroxy-terminated component suitable for the present invention may be organic, modified organic, saturated, aliphatic, alicyclic, unsaturated, araliphatic, aromatic, substituted, or unsubstituted in nature. For example, the hydroxy-terminated component may be hydroxy-terminated polyhydrocarbons including, but not limited to, hydroxy-terminated polybutadiene; hydroxy-terminated polyisoprene; poly(hydrogenated isoprene) polyol; poly(hydrogenated butadiene) polyol; and mixtures thereof.

The hydroxy-terminated component preferably has two or more reactive hydrogen groups per molecule, such as primary or secondary hydroxy groups, and at least one conjugated diene hydrocarbon. The conjugated diene hydrocarbon may be unsubstituted, 2-substituted, or 2,3-disubstituted 1,3-dienes or 4 up to about 12 carbon atoms. In one embodiment, the diene has up to 6 carbon atoms and the substituents in the 2- and/or 3-position may be H, alkyl, preferably lower alkyl, aryl, halogen, and mixtures thereof. The diene may be 1,3-butadiene, isoprene, 2-cyano-1,3-butadiene, 2,3-dimethyl-1,3,butadiene, 2-phenyl-1,3-butadiene, 2-methyl-3-phenyl-1,3-butadiene, and the like.

The hydroxy-terminated component may also be blended with other hydroxy-terminated components including, but not limited to, hydroxy-terminated polyester, hydroxy-terminated polyether, hydroxy-terminated polycarbonate, hydroxy-terminated polycaprolactones, hydroxy-terminated polyhydrocarbons, hydroxy-terminated acid functional oligomers or polymers (or ionomers thereof derived from partial or full neutralization with organic or inorganic cations).

Polyurea Prepolymer

When the outermost cover layer is formed from a reaction product that ultimately results in a prepolymer that includes only urea linkages, the prepolymer is the reaction product of at least one isocyanate and at least one amine-terminated component. For the purposes of the present invention, polyurea prepolymers include primarily urea linkages having the following general structure:

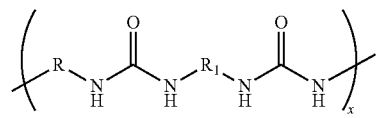

where x is the chain length, i.e., about 1 or greater, and R includes straight chain or branched hydrocarbon chains having about 1 to about 20 carbons, phenyl groups, and mixtures thereof, and $R_1$ is a straight chain or branched hydrocarbon chain having about 1 to about 20 carbons.

The main difference between the polyurethane prepolymer discussed above and the polyurea prepolymer discussed in this section is the substitution of the hydroxy-terminated component with an amine-terminated component. Therefore, the isocyanates suitable for inclusion in the polyurea prepolymers are the same as those listed above with respect to the polyurethane prepolymers, which are incorporated by reference here.

It should be understood, however, that a prepolymer including primarily urea linkages may have distinctly different properties than a prepolymer including primarily urethane linkages due to the substitution of the hydroxy-terminated component with the amine-terminated component. For example, when a polyurea prepolymer is used, the resulting composition may have different shear, cut, resiliency, and adhesion properties than a composition formed from a polyurethane prepolymer.

The amine-terminated component suitable for the present invention may be organic, modified organic, saturated, aliphatic, alicyclic, unsaturated, araliphatic, aromatic, substituted, or unsubstituted in nature. The molecular weight of the amine-terminated component for use in the invention may range from about 100 to about 10,000. In one embodiment, the amine-terminated component is about 500 or greater, preferably about 1,000 or greater, and even more preferably about 2,000 or greater. In another embodiment, the amine-terminated component molecular weight is about 8,000 or less, preferably about 4,000 or less, and more preferably about 3,000 or less. For example, in one embodiment, the molecular weight of the amine-terminated component is about 1,000 to about 4,000. Because lower molecular weight amine-terminated components may be prone to forming solid polyureas, a higher molecular weight oligomer may be used to avoid solid formation.

The amine-terminated component may be amine-terminated polyhydrocarbons including, but not limited to, amine-terminated polybutadiene; amine-terminated polyisoprene; poly(hydrogenated isoprene) amine; poly(hydrogenated butadiene) amine; and mixtures thereof. In particular, the amine-terminated component preferably has two or more reactive amino groups per molecule, such as primary or secondary amino groups, and at least one conjugated diene hydrocarbon. The conjugated diene hydrocarbon may be unsubstituted, 2-substituted, or 2,3-disubstituted 1,3-dienes or 4 up to about 12 carbon atoms. In one embodiment, the diene has up to 6 carbon atoms and the substituents in the 2- and/or 3-position may be H, alkyl, preferably lower alkyl, aryl, halogen, and mixtures thereof. The diene may be 1,3-butadiene, isoprene, 2-cyano-1,3-butadiene, 2,3-dimethyl-1,3,butadiene, 2-phenyl-1,3-butadiene, 2-methyl-3-phenyl-1,3-butadiene, and the like.

The amine-terminated component may be blended with other amine-terminated components including, but not limited to, amine-terminated hydrocarbons, amine-terminated polyethers, amine-terminated polyesters, amine-terminated polycarbonates, amine-terminated polycaprolactones, and mixtures thereof.

Hybrid Prepolymer

When the outermost cover layer is formed from a reaction product that ultimately results in a prepolymer that includes both urethane and urea linkages, the prepolymer is the reaction product of at least one isocyanate and at least one the isocyanate-reactive component may have at least one terminal hydroxyl group and at least one terminal amino group. In particular, the isocyanate-reactive component may have at least one conjugated diene hydrocarbon terminated at one end with a primary or secondary amino group and terminated at the other end with a primary or secondary hydroxyl group.

In this regard, the hybrid isocyanate-reactive component may have one of the following general formulas:

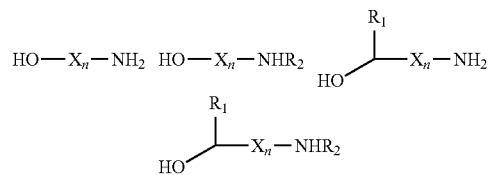

R, $R_1$, and $R_2$ may independently be any alkyl group having from about 1 to about 20 carbon atoms, preferably about 1 to about 12 carbon atoms, a phenyl group, a cyclic group, or mixture thereof. X may be unsubstituted, 2-substituted, or 2,3-disubstituted 1,3-dienes or 4 up to about 12 carbon atoms and n is the chain length, i.e., about 1 or greater. In one embodiment, the diene has up to 6 carbon atoms and the substituents in the 2- and/or 3-position may be H, alkyl, preferably lower alkyl, aryl, halogen, and mixtures thereof. The diene may be 1,3-butadiene, isoprene, 2-cyano-1,3-butadiene, 2,3-dimethyl-1,3,butadiene, 2-phenyl-1,3-butadiene, 2-methyl-3-phenyl-1,3-butadiene, and the like.

Curative

The prepolymers outlined above may be at least partially crosslinked with a curative including an amine-terminated curing agent, a hydroxy-terminated curing agent, or mixtures thereof. The use of such curatives promotes crosslinking of the hard segments, i.e., the isocyanate groups and the amino and/or hydroxy groups. Suitable curatives are discussed in more detail below.

In particular, whether the curative is a single amine-terminated curing agent and/or hydroxy-terminated curing agent or a mixture of amine-terminated curing agent(s) and/or hydroxy-terminated curing agent(s), once reacted with the prepolymer, the isocyanate (NCO) groups react with the hydroxyl or amino groups to at least partially crosslink the prepolymer.

When a polyurethane prepolymer is reacted with a curing agent or curative blend including only hydroxy-terminated components, the resulting polymer also includes only urethane linkages. When a polyurea prepolymer reacts with a curing agent or curative blend including only amine-terminated components, the resulting polymer includes only urea linkages. When a hybrid prepolymer reacts with a curing agent or curative blend including hydroxy-terminated or amine-terminated components, the resulting polymer includes urea and urethane linkages.

Amine-Terminated Curing Agents

The prepolymers of the invention may be cured with a single amine-terminated curing agent or a mixture of amine-terminated curing agents. Suitable amine-terminated curing agents include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis- (methylamine), isomers, and mixtures thereof; diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-benzene; and derivatives thereof; 1,4-bis-(sec-butylamino)-benzene; 1,2-bis-(sec-butylamino)-benzene; N,N'-dialkylamino-diphenylmethane; trimethyleneglycol-ci-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-ciaminocyclohexylmethane; and mixtures thereof. In one embodiment, the amine-terminated curing agent is 4,4'-bis-(sec-butylamino)-dicyclohexylmethane.

In addition, any of the amine-terminated moieties listed above for use as the isocyanate-reactive component to form the prepolymer may be used as curing agents to react with the prepolymers. Of the list above, the saturated amine-terminated curing agents suitable for use with the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino-cyclohexane; derivatives of 4,4'-bis-(sec-butylamino)-dicylohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; triethanolamine; monoisopropanolamine, diisopropanolamine; triisopropanolamine; isophoronediamine; N,N'-diisopropylisophorone diamine and mixtures thereof.

In one embodiment, the curative used with the prepolymer includes 3,5-dimethylthio-2,4-toluenediamine; 3,5-dimethyl-thio-2,6-toluenediamine; 4,4'-bis-(sec-butylamino)-diphenylmethane; N,N'-diisopropyl-isophorone diamine; polyoxypropylene diamine; propylene oxide-based triamine; 3,3'-dimethyl-4,4'-diaminocyclohexylmethane; and mixtures thereof. In addition, a trifunctional curing agent can be used to help improve cross-linking and, thus, to further improve the shear resistance of the resulting polyurea elastomers. In one embodiment, a triol such as trimethylolpropane or a tetraol such as N,N,N',N'-tetrakis (2-hydroxylpropyl)ethylenediamine may be added to the formulations.

Hydroxy-Terminated Curing Agents

The prepolymers of the invention may also be cured with a single hydroxy-terminated curing agent or a mixture of hydroxy-terminated curing agents. Suitable hydroxy-terminated curing agents include, but are not limited to, ethylene glycol; diethylene glycol; polyethylene glycol; propylene glycol; 2-methyl-1,3-propanediol; 2-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N'N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; polytetramethylene ether glycol, preferably having a molecular weight ranging from about 250 to about 3900; resorcinol-di-(beta-hydroxyethyl) ether and its derivatives; hydroquinone-di-(beta-hydroxyethyl)ether and its derivatives; 1,3-bis-(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; N,N-bis(β-hydroxypropyl)aniline; 2-propanol-1,1'-phenylaminobis; and mixtures thereof.

The saturated hydroxy-terminated curing agents, included in the list above, are preferred when making a light stable formulation. Those saturated hydroxy-terminated curing agents include, but are not limited to, ethylene glycol; diethylene glycol; polyethylene glycol; propylene glycol; 2-methyl-1,3-propanediol; 2-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyetyoxy)ethoxy]ethoxy}cyclohexane; polytetramethylene ether glycol having molecular weight ranging from about 250 to about 3,900; and mixtures thereof.

Hybrid Curing Agents

The curative may also include at least one hydroxy-terminated curing agent and at least one amine-terminated curing agent. Any of the hydroxy-terminated curing agents and amine-terminated curing agents discussed in the preceding sections is suitable for use in forming hybrid curing agents as the curative for use in the present invention.

Free Radical Initiator

The present invention also contemplates the use of free radical initiators. Suitable free radical initiators for use with the present invention include any type of photoinitiator. For example, suitable photoinitiators for use as the free radical initiator include any chemical compound that decomposes into free radicals when exposed to light. The free radical initiator promotes crosslinking of the unsaturated segments of the prepolymer, i.e., the conjugated diene hydrocarbon.

In one embodiment, the free radical initiator includes a peroxide. The peroxide is not specifically limited, however, suitable peroxides include, but are not limited to, dicumyl peroxide, α-α-bis(t-butyl peroxy) diisopropylbenzene, and mixtures thereof. In addition, di-t-amyl peroxide, 1,1-bis(t-butylperoxy)-3,3,5-trimethylcyclohexane or 1,1-di(t-butylperoxy) 3,3,5-trimethyl cyclohexane, di-t-butyl peroxide, 2,5-di-(t-butylperoxy)-2,5-dimethyl hexane, 2,5-dimethyl-2,5-di-benzoylperoxyhexane, n-butyl-4,4-bis(t-butylperoxy) valerate, lauryl peroxide, benzoyl peroxide, t-butyl hydroperoxide, t-butyl cumylperoxide, t-butyl peroxybenzoate, 2,4-dichloro-benzoyl peroxide, and mixtures thereof are contemplated for use in curing the unsaturated soft segments in the prepolymer.

The peroxide is typically present in an amount greater than about 0.1 parts per hundred of the formulation, preferably about 0.1 to 15 parts per hundred of the formulation, and more preferably about 0.2 to 5 parts per hundred of the formulation. If the peroxide is present in pure form, it is preferably present in an amount of at least about 0.25 pph, more preferably between about 0.35 pph and about 2.5 pph, and most preferably between about 0.5 pph and about 2 pph per hundred of the formulation. Peroxides are also available in concentrate form, which are well-known to have differing activities. In this case, if concentrate peroxides are employed in the present invention, one skilled in the art would know that the concentrations suitable for pure peroxides are easily adjusted for concentrate peroxides by dividing by the activity.

In addition to peroxides, other free radical sources suitable for use with the present invention include persulfates, azo compounds, benzophenones, hydrazides, and combinations thereof. In this aspect of the invention, the amount of free radical source is about 5 pph or less, preferably about 3 pph or less, more preferably about 2.5 pph or less, and even more preferably about 2 pph or less per hundred of the formulation. In still another embodiment, the amount of free radical source is about 1 pph or less, preferably about 0.75 pph or less per hundred of the formulation.

The amine-terminated and hydroxy-terminated curing agents may be present in a blend with the free radical initiator. For example, in one embodiment, the curative blend includes at least one amine-terminated curing agent and a free radical initiator. In another embodiment, the curative blend is a mixture of at least one hydroxy-terminated curing agent and a free radical initiator. In yet another embodiment, the curative blend includes at least one hydroxy-terminated curing agent, at least one amine-terminated curing agent, and a free radical initiator.

Additives

The formulations of the present invention also optionally include additives, fillers, and combinations thereof. In one embodiment, the additives and/or fillers may be present in an amount of from 0 weight percent to about 50 weight percent, based on the total weight of the formulation. In another embodiment, the additives and/or fillers may be present in an amount of from about 5 weight percent to about 30 weight percent, based on the total weight of the formulation. In still another embodiment, the additives and/or fillers may be present in an amount of from about 10 weight percent to about 20 weight percent, based on the total weight of the formulation.

Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof.

Methods of Making the Formulation

The formulations of the invention are formed using the prepolymer technique, which requires a first reaction between the isocyanate-reactive component(s) and an isocyanate to produce the prepolymer, and a subsequent reaction between the prepolymer and a curing agent or curative blend. In contrast, the one-shot technique involves the reaction of the isocyanate-containing component, the isocyanate-reactive component, and the curing agent or curative blend in one step. While the one-shot method may be used for other layers of the golf ball that include a formulation formed from an isocyanate-containing component, an isocyanate-reactive component, and a curing agent or curative blend, the outermost cover layer is formed using the prepolymer technique because it provides better control of chemical reaction and, consequently, results in more uniform properties for the elastomers.

In one embodiment, the prepolymer and curative are mixed and poured into a mold to form a golf ball layer, which is discussed in more detail below.

Methods of Making Golf Balls According to the Present Invention

Depending on the various golf ball layers included in the golf ball, a variety of application techniques may be used to form the golf balls of the invention. Conventionally, compression molding and injection molding are applied to thermoplastic materials, whereas RIM, liquid injection molding, and casting are employed on thermoset materials. As such, the various golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like.

In one embodiment, the formulation described above is used form an outermost cover layer of a golf ball. For example, the formulation may be used to form a single cover layer disposed about a golf ball core. The core may include more than one layer, e.g., an innermost core and an outer core layer.

As such, a core suitable for use in a golf ball formed according to the invention may be formed by any suitable method known to those of ordinary skill in art. For example, when the cores are formed from a thermoset material, compression molding is a particularly suitable method of forming the core. If the core is formed from a thermoplastic material, the cores may be injection molded.

If intermediate layer(s) are included between the core and outermost cover, such layers may also be formed using any suitable method known to those of ordinary skill in the art. For example, an intermediate layer may be formed by blow molding and covered with a dimpled cover layer formed by injection molding, compression molding, casting, vacuum forming, powder coating, and the like.

The outermost cover layer, cast from the formulation described above, is disposed about the inner ball. In one version of the casting method suitable for use in forming the outermost cover layer in accordance with the present invention, the mixture of the prepolymer and curative is dispensed into an upper mold cavity. Then, the corresponding lower mold cavity is filled with the prepolymer and curative.

As shown in FIG. 1, the upper and lower mold cavities 12 and 14 may have a hemispherical structure. In addition, the upper and lower mold cavities 12 and 14 include at least one protrusion thereon that produces at least one dimple on the outermost cover layer. For example, as shown in FIG. 1, the upper and lower mold cavities 12 and 14 of golf ball mold 10 may have interior dimple patterns 12a and 14a. Since the use of various dimple patterns and profiles provide a relatively effective way to modify the aerodynamic characteristics of a golf ball, the manner in which the dimples are arranged on the surface of the ball can be any available method. For instance, the ball may have an icosahedron-based pattern, a tetrahedral-based dimple pattern, or an octahedral-based dimple pattern. Furthermore, the resultant golf balls prepared according to the present invention typically will have dimple coverage greater than about 60 percent, preferably greater than about 65 percent, and more preferably greater than about 70 percent.

The upper and lower mold cavities 12 and 14 are typically heated beforehand. A ball cup holds the golf ball subassembly (core and any overlying casing layers) under vacuum. After the prepolymer in the first mold-half has reached a semi-gelled or gelled state, the pressure is removed and the golf ball is lowered into the upper mold-half containing the prepolymer and curative. Then, the first mold-half is inverted and mated with the second mold-half containing the prepolymer and curative which also has reached a semi-gelled or gelled state. The prepolymer and curative contained in the mold members that are mated together form the outermost cover of the golf ball. The mated first and second mold-halves containing the prepolymer and curative and golf ball center may be heated so that the prepolymer cures and hardens. The golf ball mold 10 may be used in a mold frame, such as the one described in U.S. Pat. No. 8,714,956, the entire disclosure of which is incorporated by reference herein.

The temperature of the mold and the time period the formulation is present in the mold should be controlled such that only the hard segments of the prepolymer are cross-linked. In particular, the temperature should be controlled such that the free radicals in the formulation are not initiated. In this aspect, the temperature of the mold preferably ranges from about 100° F. to about 250° F. In one embodiment, the mold temperature ranges from about 120° F. to about 200° F. In another embodiment, the temperature of the mold ranges from about 140° F. to about 180° F. In still another embodiment, the mold temperature is about 150° F. to about 170° F. The formulation should remain present in the mold for a time period ranging from about 1 minute to about 30 minutes. In another embodiment, the period of time ranges from about 5 minutes to about 20 minutes, preferably about 8 minutes to about 15 minutes.

After the above-mentioned casting process occurs, the provisional golf ball is removed from the mold and heated and cooled accordingly. The outermost cover layer of the provisional golf ball includes crosslinking of the hard segments, i.e., the isocyanate groups and the amino and/or hydroxy groups, which provides the outermost cover layer with a certain material hardness.

Figure 2:
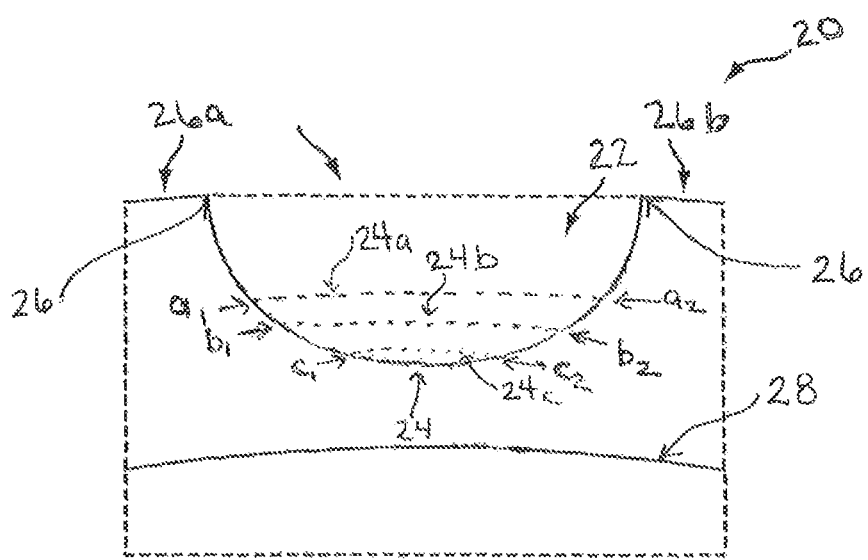
FIG. 2 is a cross-sectional view of a dimple.

The provisional golf ball is then placed into a second mold, which includes upper and lower masks. The second mold is designed such that the mold masks some portion of the dimples on the golf ball outermost cover layer while leaving other portions of the dimples exposed. As mentioned above, the golf ball outermost cover layer includes a dimple pattern. For the purposes of the present invention, the dimple pattern includes the dimple and the landing area. By the term, "dimple", it is meant to include the portions of the dimple from the innermost edge of a first adjacent land area to the innermost edge of a second adjacent land area including the lower inside area of the curve of the dimple. By the term, "land area", it is meant the upper flattened portion of the outermost cover layer extending from dimple to dimple. For example, as generally shown in the cross-sectional view of one dimple 22 on golf ball 20 in FIG. 2, dimple 22 has a bottom surface 24 and land areas 26a and 26b. The innermost edge of land area 26a is 26c and the innermost edge of land area 26b is 26d. For illustrative purposes, the inner ball 28, e.g., the core in a two-piece ball or the intermediate layer in a multi-piece ball, is shown.

Figure 3:
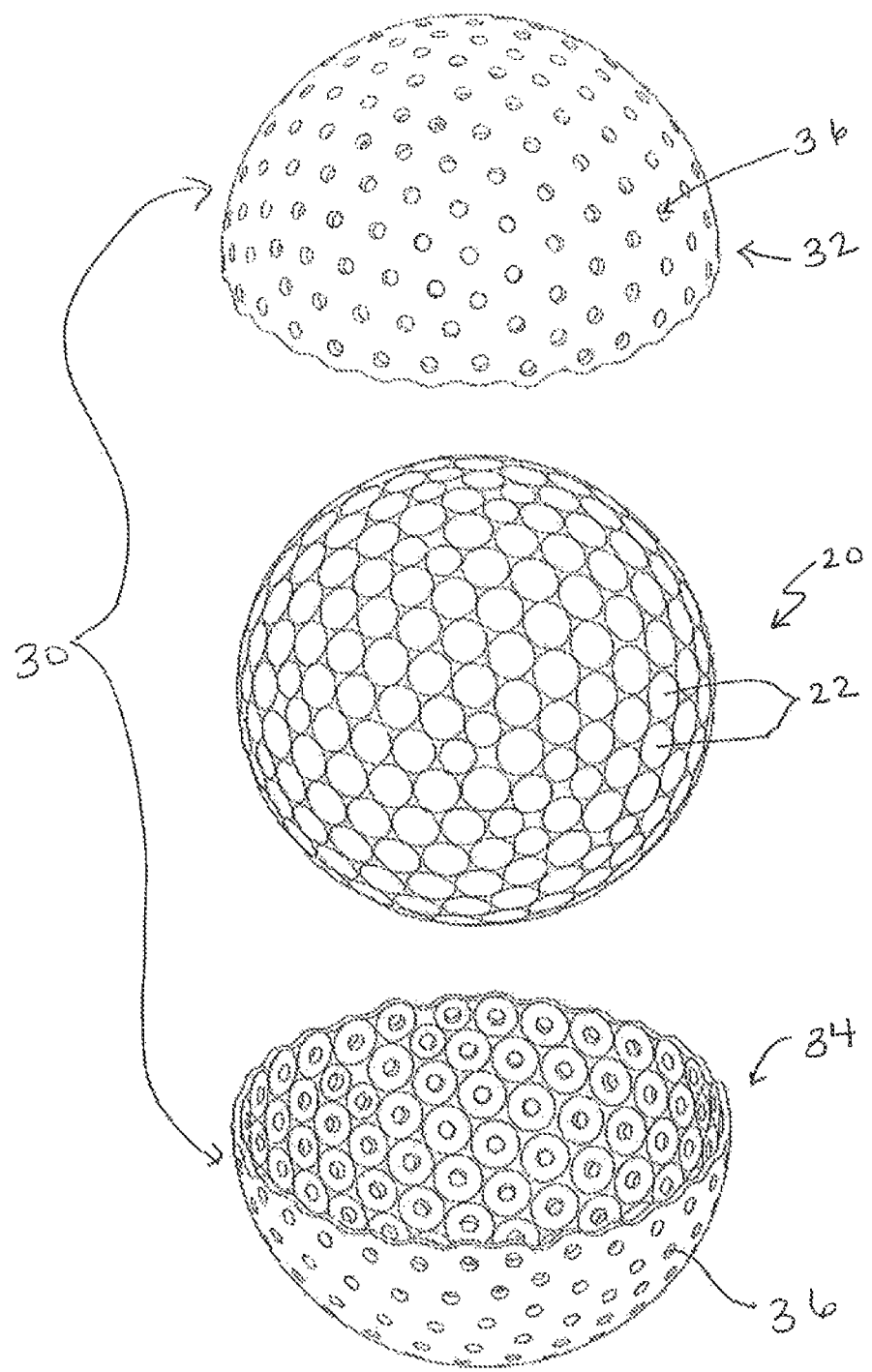
FIG. 3 shows a golf ball mold according to one embodiment of the present invention.

The second mold 30 may mask the dimples, the land areas, or some combination of both the dimples and the land areas. In one embodiment, as shown in FIG. 3, the upper and lower masks 32 and 34 of the second mold 30 include exposure areas 36 that cover the land areas of the dimples such that the lowest part of the dimples, i.e., 24c (from $c_1$ to $c_2$), are exposed. In another embodiment, the exposure areas 36 in the upper and lower masks 32 and 34 cover the land areas of the dimples such that area 24b is exposed, i.e., from $b_1$ to $b_2$, where the area defined by $b_1$-$b_2$ is greater than the area defined by $c_1$-$c_2$. In yet another embodiment, the exposure areas 36 of the upper and lower masks 32 and 34 cover the land areas of the dimples such that area 24a is exposed, i.e., from $a_1$ to $a_2$, where the area defined by $a_1$-$a_2$ is greater than the areas defined by $b_1$-$b_2$ and $c_1$-$c_2$.

Figure 4:
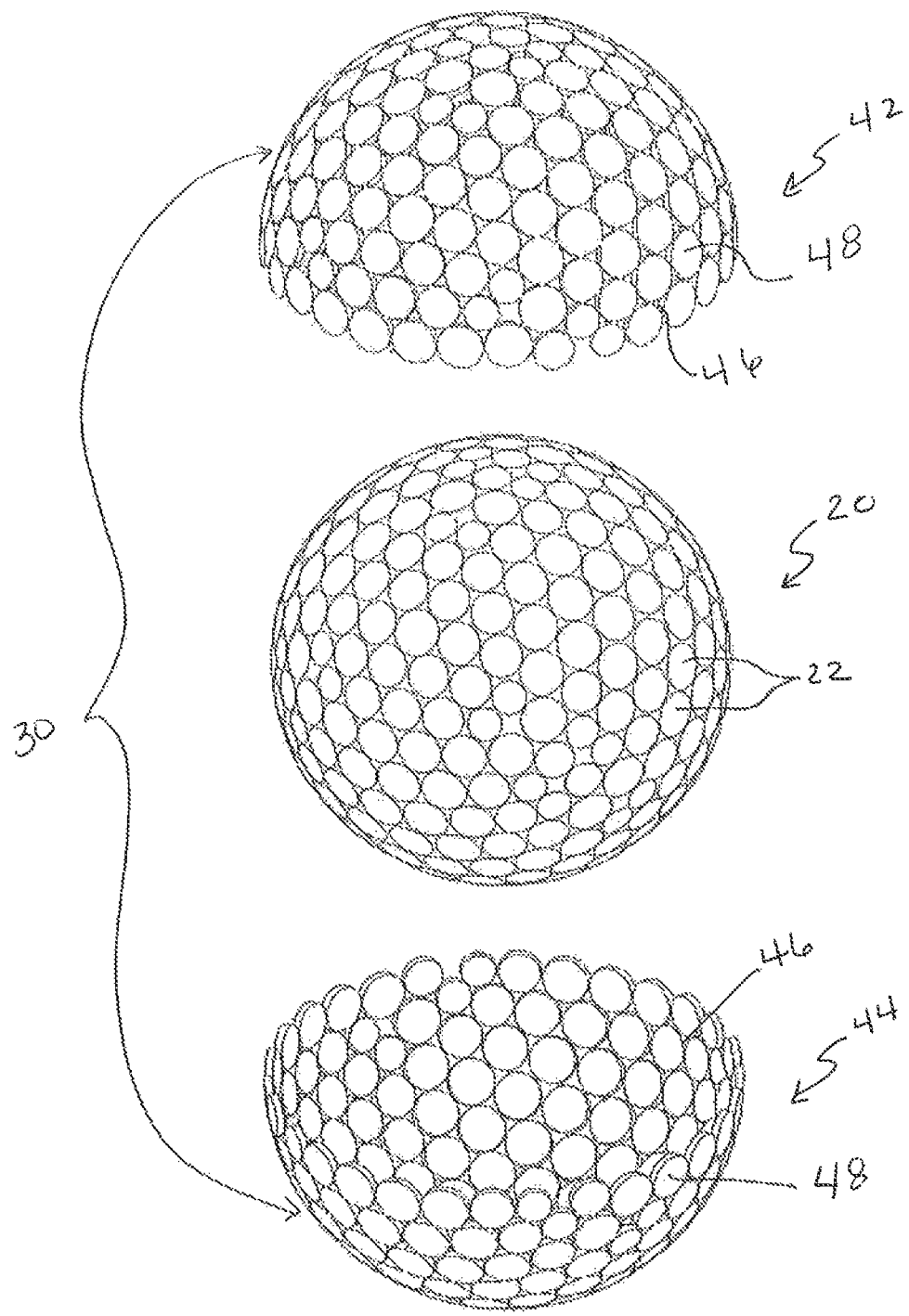
FIG. 4 shows a golf ball mold according to another embodiment of the present invention.

In another embodiment, as shown in FIG. 4, the upper and lower masks 42 and 44 of the second mold 30 include exposure areas 46 that cover the lower parts of the dimples, e.g., 24a-24c, such that the land areas 26a and 26b are exposed. For example, the areas 48 may cover all or portions of the bottom surface of the dimple to the land area. In yet another embodiment, the masks may cover a combination of portions of the lower parts of the dimples and portions of the land areas. In addition, the upper and lower masks may be the same or different.

Figure 5:
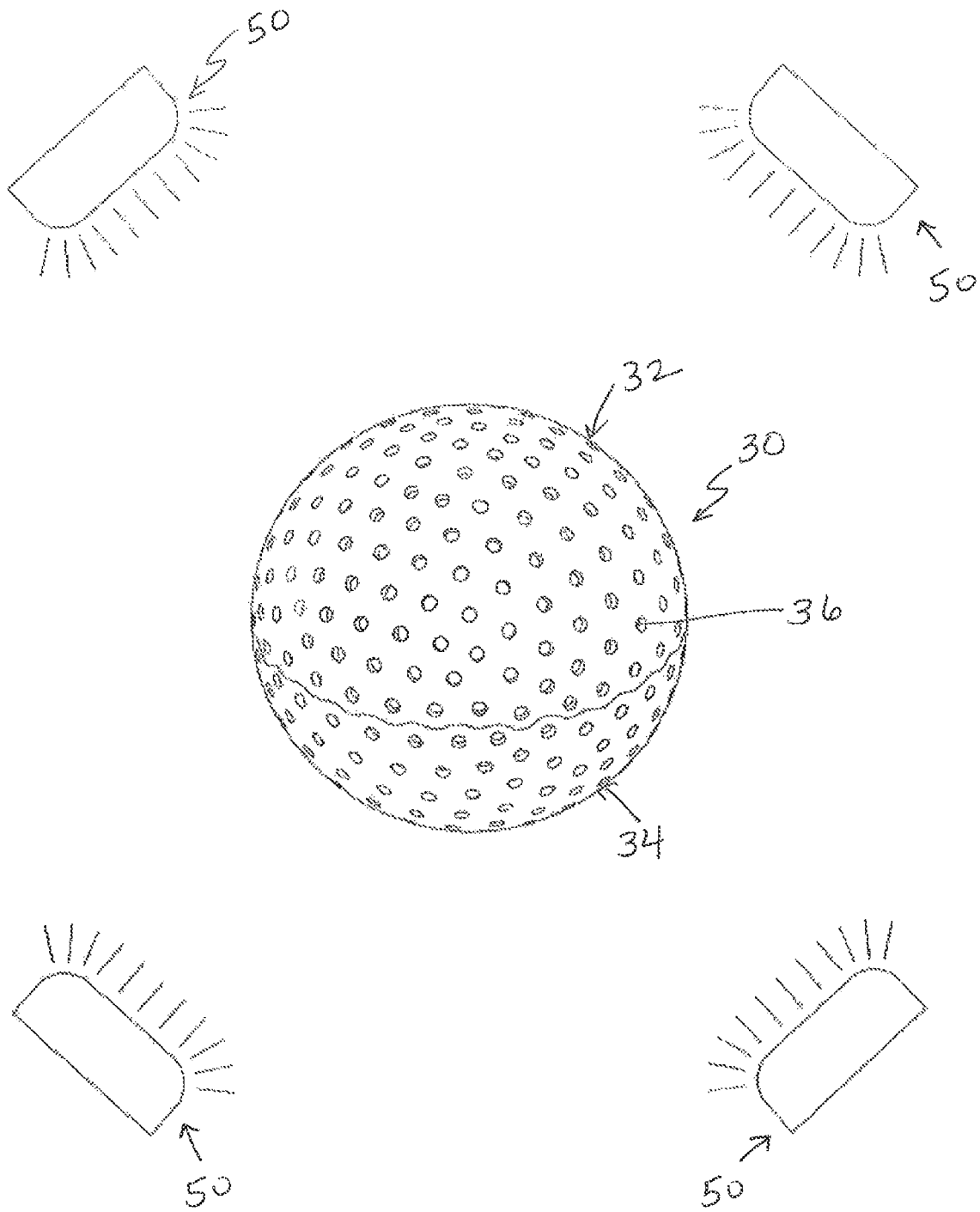
FIG. 5 illustrates one aspect of the method according to the present invention.
Figure 6:
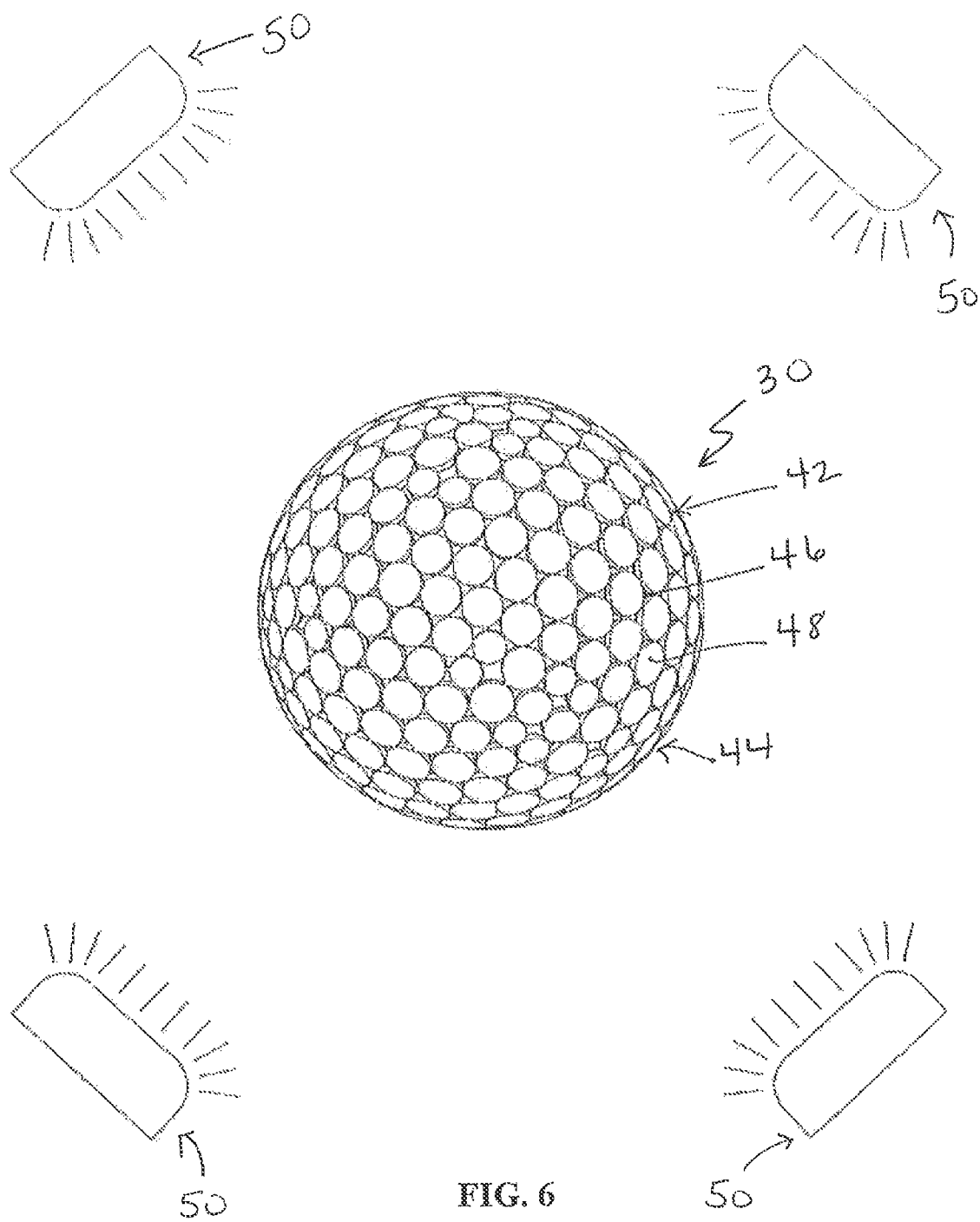
FIG. 6 illustrates another aspect of the method according to the present invention.
Figure 7:
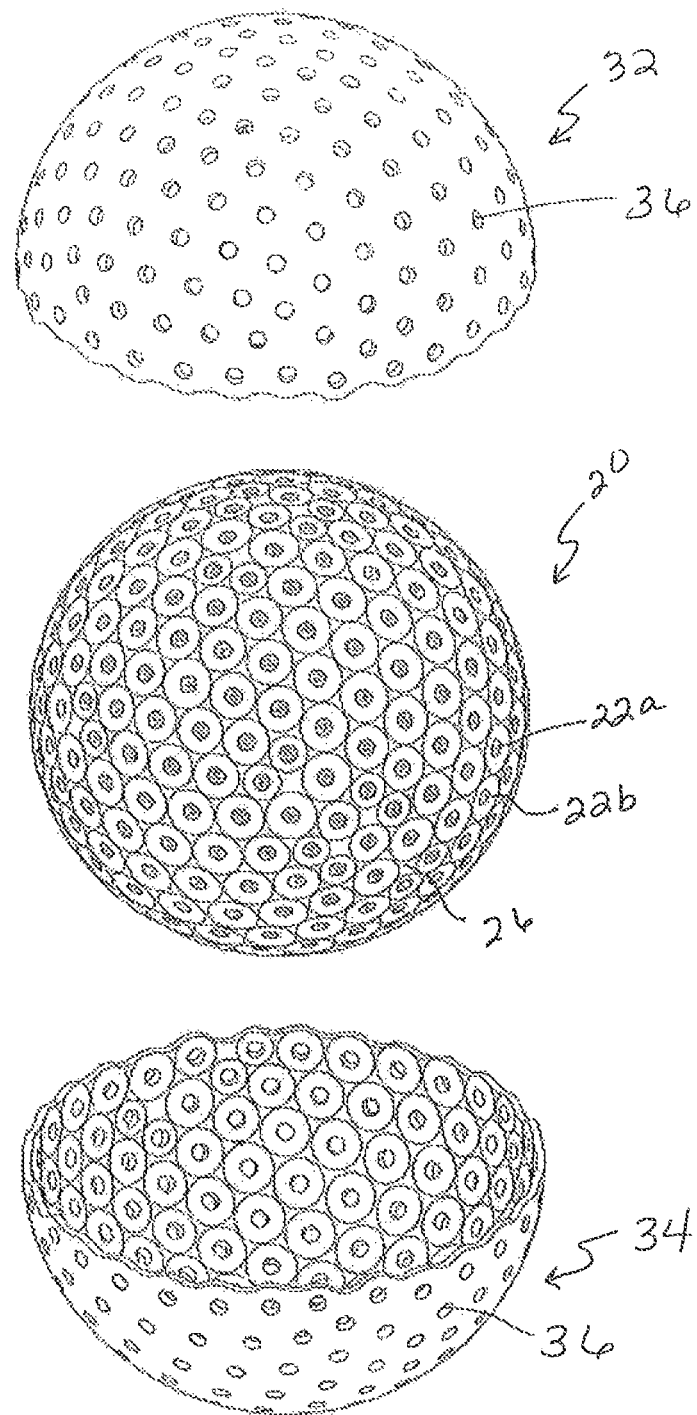
FIG. 7 shows a golf ball having dimples exhibiting two distinct hardness regions according to one embodiment of the present invention.
Figure 8:
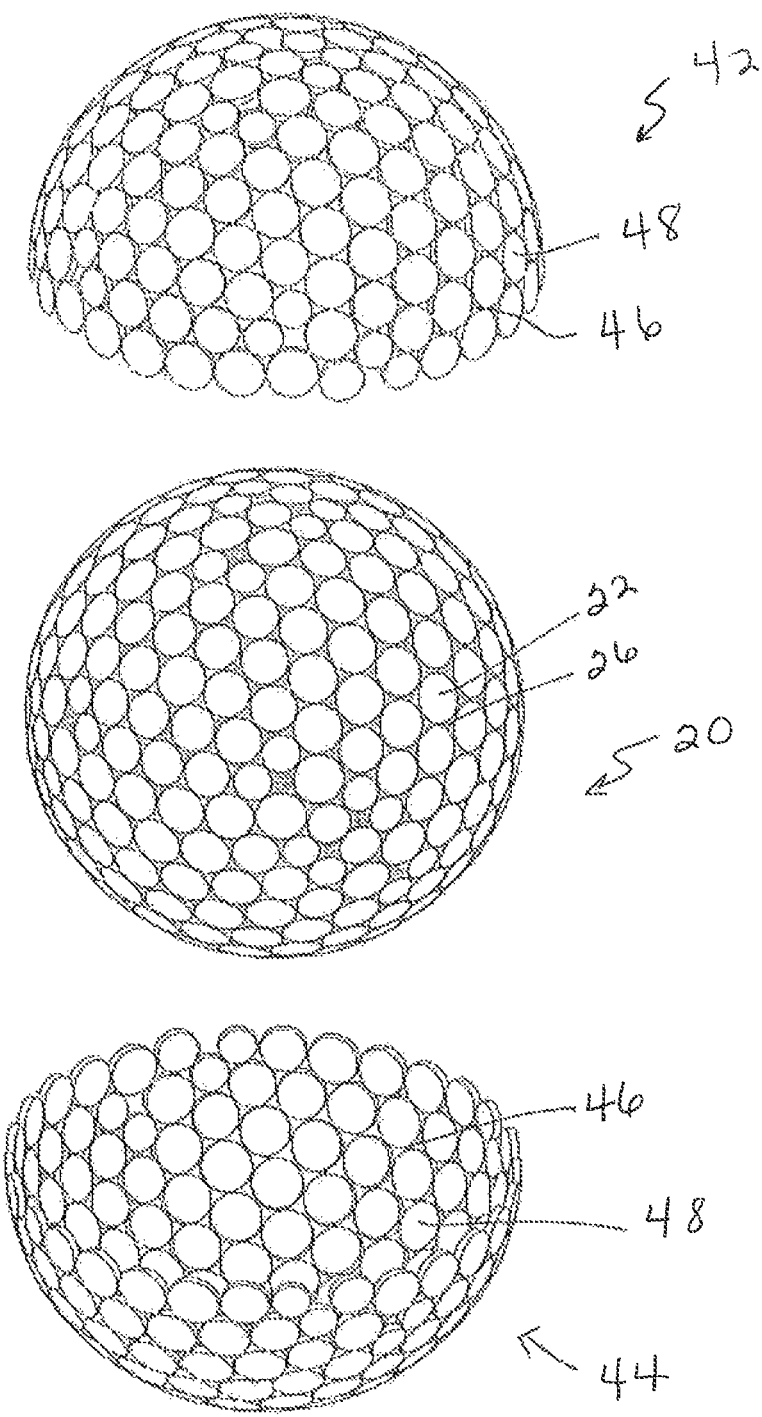
FIG. 8 shows a golf ball having dimples exhibiting two distinct hardness regions according to another embodiment of the present invention.

After the provisional golf ball is placed inside of the second mold, the second mold (including the golf ball placed inside) is exposed to a treatment 50 capable of promoting crosslinking of the unsaturated segments of the prepolymer, i.e., the conjugated diene hydrocarbon. As shown in FIGS. 5 and 6, the golf ball is placed within the second mold 30 to form an interlocking assembly which is then exposed to the treatment. As a result, the portions of the golf ball cover exposed to the treatment will have a different material hardness than the portions of the golf ball cover masked by the mold. For example, in one embodiment, as shown in FIG. 7, since at least a portion of the dimples 22 were exposed, the exposed portion 22a may have a greater material hardness than that of the unexposed portion of the dimples 22b and the land areas 26. In another embodiment, as shown in FIG. 8, the land areas 26 may have a greater material hardness than that of the dimples 22.

In this aspect, the present invention contemplates the use of any type of treatment 50 capable of initiating free radicals and breaking the double bonds of the unsaturated compound in the prepolymer. In one embodiment, the second mold 30 (including the golf ball placed inside) is subjected to ultra-violet ("UV") light. UV light may include any type of ultraviolet radiation having a wavelength of about 10 nm to about 400 nm. In one embodiment, the mold is subjected to UV light for a time period of about 30 seconds to about 5 minutes, preferably about 1 minute to about 2 minutes. When the UV light is applied to the mold, any portion of the golf ball exposed to the UV light can undergo additional curing via the photo-initiator or free radical initiator present in the outermost cover layer. The photo-initiator is able to convert the absorbed UV light energy into chemical energy in the form of initiating species, i.e., the free radicals. The free radicals promote the crosslinking of the unsaturated segments of the prepolymer in the portions of the cover layer that are exposed to the UV light. Thus, the portions of the outermost cover layer unmasked or exposed to the UV light have a different material hardness than the portions that are masked from the UV light.

In another embodiment of the present invention, the second mold 30 (including the golf ball placed inside) is subjected to fiber optic lights. The fiber optic lights are positioned such that the lights contact the unmasked portions of the golf ball. The fiber optic lights may protrude through the holes of the mold such that the exposed portions of the golf ball cover are bombarded with the fiber optic light. By subjecting the unmasked portions of the golf ball cover to fiber optic lights, a new material hardness may be created such that the unmasked portions have a different hardness from the masked portions of the golf ball cover.

In yet another embodiment, the unmasked portions of the second mold 30 are subjected to a heat treatment. In this aspect, the second mold 30 is maintained at a relatively cool temperature. In one embodiment, the temperature is maintained at about 60° F. to about 70° F., more preferably about 68° F. Heated protrusions are then positioned into the unmasked portions of the second mold 30 such that the heated protrusions come into direct contact with the unmasked portions of the outermost cover layer. In one embodiment, the heated protrusions are in the form of injectable pins.

The heated protrusions are heated to a temperature conducive to initiating the free radicals, e.g., the peroxides, present in the pre-formed golf ball cover layer. The protrusions are heated to a temperature ranging from about 250° F. to about 400° F. In one embodiment, the temperature may range from about 275° F. to about 350° F. In another embodiment, the temperature ranges from about 300° F. to about 330° F. The unmasked portions of the cover layer may be allowed to cure for a period of time ranging from about 5 minutes to about 25 minutes, preferably about 8 minutes to about 20 minutes, and even more preferably about 12 minutes to about 18 minutes. After the unmasked portions have undergone the additional curing, the unmasked portions exhibit a different hardness from the masked portions of the outermost cover layer.

In one embodiment, the unmasked portions of the outermost cover layer have a material hardness that is at least about 5 percent greater than the masked portions of the cover layer. In another embodiment, the unmasked portions of the outermost cover layer have a material hardness that is at least about 10 percent greater than the masked portions of the cover layer. In yet another embodiment, the unmasked portions of the outermost cover layer have a material hardness that is at least about 20 percent greater than the masked portions of the cover layer.

In one embodiment, the unmasked portions of the outermost cover layer have a crosslinking density that is at least about 10 percent greater than the masked portions of the cover layer. In another embodiment, the unmasked portions of the outermost cover layer have a crosslinking density that is at least about 15 percent greater than the masked portions of the cover layer. In yet another embodiment, the unmasked portions of the outermost cover layer have a crosslinking density that is at least about 20 percent greater than the masked portions of the cover layer.

Accordingly, the golf balls formed from the present invention include dimples exhibiting at least two distinct hardness regions derived from a single cover layer. The distinct hardness regions may be represented by any portion of the golf ball dimple. In one embodiment, the two distinct hardness regions may be represented by the lower portions of the dimples and the land areas of the dimples. For example, the lower portions of the dimples may have a hardness of about 30 Shore D to about 75 Shore D, preferably about 35 Shore D to about 70 Shore D, while the landing areas have a hardness of about 25 Shore D to about 70 Shore D, preferably about 30 Shore D to about 65 Shore D and where lower portions of the dimples are harder than the landing areas. In another embodiment, the lower portions of the dimples may have a hardness of about 25 Shore D to about 70 Shore D, preferably about 30 Shore D to about 65 Shore D, while the landing areas have a hardness of about 30 Shore D to about 75 Shore D, preferably about 35 Shore D to about 70 Shore D, and where the landing areas are harder than the lower portions of the dimples.

Golf Ball Construction

The present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball.

Golf Ball Core Layer(s)

Any core material known to one of ordinary skill in that art is suitable for use in the golf balls of the invention. In particular, the core may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers.

The core may have a diameter of about 1.0 inches to about 1.64 inches and the cover layer thickness may range from about 0.03 inches to about 0.06 inches.

Golf Ball Intermediate Layer(s)

The present invention may also include an intermediate layer, such as an outer core layer or inner cover layer, i.e., any layer(s) disposed between the inner core and the outer cover of a golf ball. An intermediate layer may be used, if desired, with a multilayer cover or a multilayer core, or with both a multilayer cover and a multilayer core. As with the core, the intermediate layer may also include a plurality of layers.

The intermediate layer or inner cover layer having a thickness of about 0.015 inches to about 0.09 inches may be disposed about a core. In this aspect of the invention, the core has a diameter ranging from about 1.46 inches to about 1.59 inches. The inner ball may be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches.

In another embodiment, the intermediate layer is covered by an inner cover layer. For example, a ball of the invention may include a center having a diameter of about 0.5 inches to about 1.30 inches. The core may be covered by an outer core layer to form a core, which may be formed form any of the core materials discussed above, or castable thermoset materials or injection moldable thermoplastic materials. The outer core layer may have a thickness of about 0.125 inches to about 0.500 inches. The core may then be covered with a casing layer having a thickness of about 0.015 inches to about 0.09 inches. The outer cover layer, which preferably has a thickness of about 0.02 inches to about 0.045 inches, may be formed from a castable thermoset material or an injection moldable thermoplastic material or other suitable cover materials discussed below and known in the art.

The intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly(ether-amide), polyphenylene oxide resins or blends thereof, and thermoplastic polyesters.

Golf Ball Cover Layer(s)

The cover provides the interface between the ball and a club. Properties that are desirable for the cover are good moldability, high moisture resistance, high abrasion resistance, high impact resistance, high tear strength, high resilience, and good mold release, among others. The cover layer may be formed, at least in part, from the formulation of the invention. Golf balls according to the invention may also be formed having a cover of polyurethane, polyurea, and polybutadiene materials.

In one embodiment, the cover may have a thickness of about 0.02 inches or greater. In another embodiment, the cover may be about 0.03 inches or greater in thickness. In still another embodiment, the thickness of the cover may range from about 0.02 inches to about 0.05 inches.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. Any of the golf ball layers may be surface treated by conventional methods including blasting, mechanical abrasion, corona discharge, plasma treatment, and the like, and combinations thereof.

Golf Ball Properties

The properties such as core diameter, intermediate layer and cover layer thickness, hardness, and compression have been found to affect play characteristics such as spin, initial velocity, and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight.

The preferred diameter of the golf balls is from about 1.680 inches to about 1.800 inches, more preferably from about 1.680 inches to about 1.760 inches. A diameter of from about 1.680 inches (43 mm) to about 1.740 inches (44 mm) is most preferred; however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

If the core has multiple layers, such multi-layer cores of the present invention have an overall diameter within a range having a lower limit of about 1.0 or about 1.3 or about 1.4 or about 1.5 or about 1.6 or about 1.61 inches and an upper limit of about 1.62 inches or about 1.63 inches or about 1.64 inches. In a particular embodiment, the multi-layer core has an overall diameter of about 1.5 inches or about 1.51 inches or about 1.53 inches or about 1.55 inches or about 1.57 inches or about 1.58 inches or about 1.59 inches or about 1.6 inches or about 1.61 inches or about 1.62 inches.

The inner core has an overall diameter of about 0.5 inches or greater, or about 0.75 inches or greater, or about 0.8 inches or greater, or about 0.9 inches or greater, or about 1.0 inches or greater, or about 1.150 inches or greater, or about 1.25 inches or greater, or about 1.35 inches or greater, or about 1.39 inches or greater, or about 1.45 inches or greater, or an overall diameter within a range having a lower limit of about 0.25 or about 0.5 or about 0.75 or about 0.8 or about 0.9 or about 1.0 or about 1.1 or about 1.15 or about 1.2 inches and an upper limit of about 1.25 or about 1.3 or about 1.35 or about 1.39 or about 1.4 or about 1.44 or about 1.45 or about 1.46 or about 1.49 or about 1.5 or about 1.55 or about 1.58 or about 1.6 inches.

Each optional intermediate core layer may have an overall thickness within a range having a lower limit of about 0.005 inches to about 0.040 inches and an upper limit of about 0.05 inches to about 0.200 inches.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.015 inches to about 0.06 inches. In another embodiment, the intermediate layer thickness is about 0.05 inches or less, more preferably about 0.01 inches to about 0.045 inches.

Hardness

The cores included in the golf balls of the present invention may have varying hardnesses depending on the particular golf ball construction. In one embodiment, the core hardness ranges from about 50 Shore C to about 65 Shore C. In another embodiment, the core has a hardness ranging from about 50 Shore C to about 85 Shore C.

The intermediate layers of the present invention may also vary in hardness depending on the specific construction of the ball. In one embodiment, the surface hardness of the intermediate layer may be about 70 Shore D or less, or about 65 Shore D or less, or less than about 65 Shore D, or a Shore D hardness of from about 50 to about 65, or a Shore D hardness of from about 55 to about 60.

As with the core and intermediate layers, the cover hardness may vary depending on the construction and desired characteristics of the golf ball. In one embodiment, the cover may have a surface hardness of about 60 Shore D or less and/or a material hardness of about 60 Shore D or less. In another embodiment, the cover is a dual- or multi-layer cover including an inner or intermediate cover layer and an outer cover layer formed. The inner layer may have a surface hardness of about 70 Shore D or less, or about 65 Shore D or less, or less than about 65 Shore D, or a Shore D hardness of from about 50 to 65, or a Shore D hardness of from about 55 to 60. The outer cover layer may have a surface hardness ranging from about 20 Shore D to about 75 Shore D.

Compression

Compression is an important factor in golf ball design. For example, the compression of the core can affect the ball's spin rate off the driver and the feel. In fact, the formulations and methods of the present invention result in golf balls having increased compressions and ultimately an overall harder ball. The harder the overall ball, the less deformed it becomes upon striking, and the faster it breaks away from the golf club.

As disclosed in Jeff Dalton's *Compression by Any Other Name, Science and Golf IV, Proceedings of the World Scientific Congress of Golf* (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring.

Golf balls of the present invention typically have a compression of 40 or greater, or a compression within a range having a lower limit of 50 or 60 and an upper limit of 100 or 120.

Coefficient of Restitution

The coefficient of restitution or COR of a golf ball is a measure of the amount of energy lost when two objects collide. The COR of a golf ball indicates its ability to rebound and accounts for the spring-like feel of the ball after striking. As used herein, the term "coefficient of restitution" (COR) is calculated by dividing the rebound velocity of the golf ball by the incoming velocity when a golf ball is shot out of an air cannon. The COR testing is conducted over a range of incoming velocities and determined at an inbound velocity of 125 ft/s.

The present invention contemplates golf balls having CORs from about 0.700 to about 0.850 at an inbound velocity of about 125 fl/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Solid spheres (1.55 inches) of the invention may have a COR of at least about 0.790, preferably at least about 0.800. For example, the COR of solid spheres of the invention ranges from about 0.810 to about 0.830. In one embodiment, a solid sphere of the invention has a COR of about 0.800 to about 0.825. In another embodiment, the COR of the solid sphere ranges from about 0.805 to about 0.815.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the formulations of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A method of forming a golf ball, comprising:
   providing a core;
   preparing a castable formulation comprising at least one prepolymer, at least one curative, and at least one free radical initiator;
   casting the formulation into upper and lower cavities of a golf ball mold, wherein upon joining the upper and lower cavities, the core is contained within the formulation;
   curing the formulation to form a provisional golf ball having an outermost surface comprising a plurality of dimples;
   placing the provisional golf ball into a second mold, wherein the second mold comprises upper and lower masks, and wherein the upper and lower masks expose at least a portion of the outermost surface; and
   subjecting the second mold to a treatment to initiate free radicals in the formulation, wherein the exposed portion of the outermost surface undergoes additional curing to form an outermost surface comprising an exposed portion and a masked portion,
   wherein the exposed portion of the outermost surface has a different hardness than the masked portion of the outermost surface.

2. The method of claim 1, wherein the prepolymer is a reaction product of an isocyanate-containing component and an isocyanate-reactive component.

3. The method of claim 2, wherein the isocyanate-reactive component comprises a conjugated diene hydrocarbon.

4. The method of claim 1, wherein the curative comprises an amine-terminated curing agent, a hydroxy-terminated curing agent, or a combination thereof.

5. The method of claim 1, wherein the free radical initiator comprises a peroxide, a persulfate, an azo compound, a benzophenone, a hydrazide, or a combination thereof.

6. The method of claim 1, wherein the treatment comprises ultraviolet light, heat, fiber optic lights, or combinations thereof.

7. The method of claim 1, wherein the exposed portion has a hardness of about 55 Shore D to about 75 Shore D and the masked portion has a hardness of about 30 Shore D to about 50 Shore D.

8. The method of claim 1, wherein the step of curing is performed at a temperature of about 100° F. to about 250° F.

9. The method of claim 1, wherein the masked portion has a first crosslinking density and the exposed portion has a second crosslinking density, and wherein the second crosslinking density is greater than the first crosslinking density by at least about 15 percent.

10. A method of forming a golf ball, comprising:
preparing a castable formulation comprising at least one prepolymer that is a reaction product of an isocyanate-containing component and an isocyanate-reactive component, at least one curative, and at least one free radical initiator;
providing a core of a golf ball;
casting the formulation over a core in a golf ball mold;
curing the formulation to form a provisional golf ball comprising a cover layer having a first crosslinking density and a first hardness, wherein the golf ball cover layer comprises a plurality of dimples;
placing the provisional golf ball into a second mold, wherein the second mold masks a first portion of the golf ball cover layer and exposes a second portion of the golf ball cover layer; and
subjecting the second mold to ultraviolet light such that the second portion of the golf ball cover layer undergoes additional curing and has a second hardness and a second crosslinking density,
wherein the second hardness is at least 20 percent greater than first hardness.

11. The method of claim 10, wherein the isocyanate-reactive component comprises a conjugated diene hydrocarbon.

12. The method of claim 10, wherein the step of subjecting the second mold to ultraviolet light is performed for about one minute to about two minutes.

13. The method of claim 10, wherein the second hardness is about 55 Shore D to about 75 Shore D and the first hardness is about 30 Shore D to about 50 Shore D.

14. The method of claim 10, wherein the step of curing is performed at a temperature of about 100° F. to about 250° F.

15. A method of forming a golf ball, comprising:
preparing a castable formulation comprising at least one prepolymer comprising a conjugated diene hydrocarbon, at least one curative, and at least one peroxide;
providing a golf ball core;
casting the formulation over the golf ball core in a first mold;
curing the formulation to form a provisional golf ball comprising a plurality of dimples, wherein the provisional golf ball has an outermost cover layer having a first crosslinking density;
placing the provisional golf ball into a second mold, wherein the second mold comprises exposure areas and masked areas; and
contacting the areas of the outermost cover layer exposed via the exposure areas with a heated protrusion to form a golf ball comprising the exposed areas, wherein the exposed areas of the underlying outermost cover layer have a second crosslinking density greater than the first crosslinking density and a hardness of about 55 Shore D to about 75 Shore D and the masked areas of the underlying outermost cover layer have a hardness of about 30 Shore D to about 50 Shore D.

16. The method of claim 15, wherein the heated protrusion is heated to a temperature ranging from about 250° F. to about 400° F.

17. The method of claim 15, wherein the peroxide comprises dicumyl peroxide, α-α-bis(t-butyl peroxy) diisopropylbenzene, or combinations thereof.

18. The method of claim 15, wherein the heated protrusions are injectable pins.

19. The method of claim 15, further comprising maintaining the second mold at a temperature of about 60° F. to about 70° F.

20. The method of claim 15, wherein the step of curing is performed at a temperature of about 100° F. to about 250° F.

* * * * *